United States Patent Office 2,870,206
Patented Jan. 20, 1959

2,870,206

PREPARATION OF BENZOPHENONE-AZINE

Robert Meyer, Tassin-la-Demi-Lune, and Daniel Pillon, Lyon, France, assignors to Societe des Usines Chimiques Rhone-Poulenc, Paris, France, a corporation of France No Drawing. Application November 29, 1957
Serial No. 699,532

Claims priority, application France December 1, 1956

9 Claims. (Cl. 260—566)

This invention relates to a process for the preparation of benzophenone-azine.

Benzophenone-azine is generally prepared by reacting hydrazine hydrate with benzophenone. A disadvantage of this process is the high cost of hydrazine. Benzophenone-azine has also been prepared in a very small yield by reacting iodine with a substance which is presumed to be the sodium derivative of benzophenone-imine, and which is obtained by reacting chlorobenzene with benzonitrile in the presence of sodium or by reacting sodium with benzophenone-imine. On replacing iodine by air, only benzophenone-oxime has been obtained (A. A. Morton and J. R. Stevens, J. Am. Chem. Soc. 53, 2769 (1931)).

It has now been unexpectedly found that benzophenone-azine may be prepared by the oxidation of benzophenone-imine with molecular oxygen, provided that a suitable catalyst is present, in accordance with the following equation:

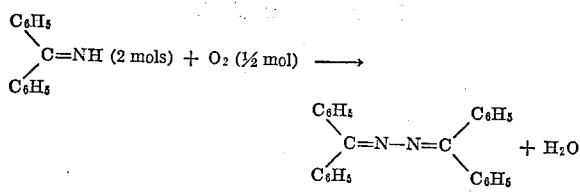

According to the present invention, therefore, a process for the preparation of benzophenone-azine comprises reacting benzophenone-imine with molecular oxygen, either pure or diluted with gas inert under the conditions employed for the process, in the presence of a catalyst in the form of a copper halide, and in the presence or absence of a diluent in the form of a solvent inert under the conditions of the process.

In the preferred form of the reaction pyridine, toluene, or dioxan can be used as solvent, or mixtures of benzophenone-imine and benzophenone, in variable proportions such as the technical products obtained by imination of benzophenone, may be employed.

The preferred copper halide is cuprous chloride. The oxygen is preferably added in the form of pure oxygen or air. When the reaction is complete the catalyst is preferably removed by treatment of the reaction mixture with aqueous ammonia or ammonium chloride.

Since benzophenone-imine is readily obtained by the reaction of ammonia with benzophenone, the invention permits of preparing benzophenone-azine from benzophenone using cheap and readily obtainable reactants, namely ammonia and oxygen, it being possible to use the latter in the form of air. The imination of the benzophenone is effected by methods known per se, for example by passing a mixture of the ketone and ammonia over a catalyst such as thoria.

Benzophenone-azine is an interesting product for industrial synthesis, for example in the preparation of hydrazine by acid hydrolysis in accordance with a reaction which has been known since the works of Curtius and Rauterberg (J. pr. Chem. 44, 200 (1891)).

The following examples illustrate the invention. Except where otherwise indicated, the parts are to be understood to be by weight. When parts by volume are mentioned, they bear the same ratio to parts by weight as litres to kilogrammes.

*Example I*

4 parts of cuprous chloride are mixed with 100 parts by volume of pyridine. The mixture heats to about 40° C. and turns green. It is agitated and cooled to 20° C.

32.5 parts of 97% benzophenone-imine, the remaining 3% being benzophenone, are poured into the mixture. The solution turns reddish-brown and the temperature rises slightly. Oxygen is then introduced under a pressure of 50 cm. of water. At the beginning, the absorption is slow and the temperature rises a little. After 4 hours, crystals are seen to appear and the solution has become green. In 6 hours 40 minutes, 1150 parts by volume of oxygen have been absorbed. The solution contains a large quantity of crystals. The pyridine-cuprous chloride complex is decomposed by means of 200 parts by volume of concentrated hydrochloric acid and ice. The white precipitate is centrifuged, washed with a little water and dried for several minutes in air, whereafter it is washed with 70 parts by volume of alcohol (95% by volume). The benzophenone is thus dissolved. The insoluble product is dried and 29.5 parts of benzophenone-azine, M. P. 163.5–165° C., are thus obtained, which corresponds to a yield of 94.5% of the theory.

0.5 part of benzophenone is recovered from the alcoholic solution. A further 1.75 parts of benzophenone are deposited by the hydrochloric acid solution. Therefore, 98% of the benzophenone-imine and benzophenone introduced are accounted for.

The same result is obtained if air is employed instead of oxygen.

*Example II*

To a mixture consisting of 246 g. of benzophenone-imine and 213 g. of benzophenone (produced by the treatment of benzophenone with ammonia) are added 10 g. of cuprous chloride, whereafter the mixture is heated at 120° C. and air is passed through the mixture at a rate of 40 litres per hour under a pressure of 6 atmospheres, for 4½ hours.

The catalyst is separated by treating the mixture either with aqueous ammonia under pressure or with a super-saturated solution of ammonium chloride at 110° C.

The product is washed with water and the benzophenone is then extracted with alcohol. Benzophenone-azine is obtained in the form of small white needles, M. P. 163–163.5° C., in a yield of 91.6%.

The benzophenone recovered from the alcoholic solution can be returned for the preparation of benzophenone-imine.

If the benzophenone-azine is intended for the preparation of hydrazine it is not necessary to separate the benzophenone from the mixture of benzophenone-azine and benzophenone, and this mixture can be directly subjected to an acid hydrolysis. The benzophenone which forms on hydrolysis and that which existed in the mixture are recovered after the separation of the hydrozine for the preparation of benzophenone-imine.

We claim:

1. A process for the preparation of benzophenone-azine which comprises reacting benzophenone-imine with molecular oxygen in a proportion of at least 1 mol for each 4 mols of benzophenone-imine, which may be diluted with a gas inert under the conditions employed for the process, in the presence of a catalytically effective amount of a copper halide and at a temperature which is at all times below the decomposition temperature of benzophenone-azine.

2. A process according to claim 1, in which the benzophenone-imine is employed in the form of a mixture with benzophenone as obtained by imination of benzophenone.

3. A process for the preparation of benzophenone-azine which comprises reacting benzophenone-imine with oxygen-containing gas in a proportion of at least 1 mol of oxygen for each 4 mols of benzophenone-imine in the presence of a catalytically effective amount of cuprous chloride and at a temperature which is at all times below the decomposition temperature of benzophenone-azine, and in the presence of a diluent in the form of a solvent chosen from the group consisting of benzophenone, pyridine, toluene and dioxan.

4. A process for the preparation of benzophenone-azine which comprises reacting benzophenone-imine with substantially pure gaseous oxygen in a proportion of at least 1 mol for each 4 mols of benzophenone-imine in the presence of a catalytically effective amount of cuprous chloride and at a temperature which is at all times below the decomposition temperature of benzophenone-azine, and in the presence of a diluent in the form of a solvent chosen from the group consisting of benzophenone, pyridine, toluene and dioxan.

5. A process for the preparation of benzophenone-azine which comprises reacting benzophenone-imine with air in a proportion of at least 1 mol of oxygen for each 4 mols of benzophenone-imine in the presence of a catalytically effective amount of cuprous chloride and at a temperature which is at all times below the decomposition temperature of benzophenone-azine, and in the presence of a diluent in the form of a solvent chosen from the group consisting of benzophenone, pyridine, toluene and dioxan.

6. A process for the preparation of benzophenone-azine which comprises reacting benzophenone-imine with molecular oxygen in a proportion of at least 1 mol for each 4 mols of benzophenone-imine, in the presence of a catalytically effective amount of a copper halide and at a temperature which is at all times below the decomposition temperature of benzophenone-azine, and in the presence of a solvent diluent, and, after completion, of the reaction, removing residual catalyst by treating the reaction mixture with aqueous ammonia.

7. A process for the preparation of benzophenone-azine which comprises reacting benzophenone-imine with molecular oxygen in a proportion of at least 1 mol for each 4 mols of benzophenone-imine, in the presence of a catalytically effective amount of a copper halide and at a temperature which is at all times below the decomposition temperature of benzophenone-azine, and in the presence of a diluent and, after completion of the reaction removing residual catalyst by treating the reaction mixture with aqueous ammonium chloride.

8. A process for the preparation of benzophenone-azine which comprises reacting benzophenone-imine with air in a proportion of at least 1 mol of oxygen for each 4 mols of benzophenone-imine in the presence of a catalytically effective amount of cuprous chloride and at a temperature which is at all times below the decomposition temperature of benzophenone-azine, and in the presence of pyridine as solvent.

9. A process for the preparation of benzophenone-azine which comprises reacting benzophenone-imine with air in a proportion of at least 1 mol of oxygen for each 4 mols of benzophenone-imine in the presence of a catalytically effective amount of cuprous chloride and at a temperature which is at all times below the decomposition temperature of benzophenone-azine and in the presence of benzophenone as solvent.

No references cited.